(12) United States Patent
Balachandran et al.

(10) Patent No.: US 8,320,479 B2
(45) Date of Patent: Nov. 27, 2012

(54) RANKING AND GROUPING OF TRANSMISSIONS IN COMMUNICATION SYSTEM

(75) Inventors: Krishna Balachandran, Morganville, NJ (US); Nandu Gopalakrishnan, Madison, NJ (US); Joseph H. Kang, Belle Mead, NJ (US); Achilles Kogiantis, New York, NY (US)

(73) Assignee: Alcatel Lucent, Paris (FR)

( * ) Notice: Subject to any disclaimer, the term of this patent is extended or adjusted under 35 U.S.C. 154(b) by 793 days.

(21) Appl. No.: 12/392,724

(22) Filed: Feb. 25, 2009

(65) Prior Publication Data

US 2010/0215108 A1 Aug. 26, 2010

(51) Int. Cl.
*H04K 1/10* (2006.01)

(52) U.S. Cl. ........ 375/260; 375/267; 375/299; 455/101; 455/132; 455/296; 455/454; 455/500; 455/562.1; 370/334; 370/464; 341/173; 341/180

(58) Field of Classification Search .......... 375/260, 375/267, 299; 455/101, 132, 296, 454, 500, 455/562.1; 370/334, 464; 341/173, 180
See application file for complete search history.

(56) References Cited

U.S. PATENT DOCUMENTS

| 8,116,267 B2* | 2/2012 | Van Rensburg et al. ...... 370/329 |
| 2002/0177447 A1* | 11/2002 | Walton et al. .................. 455/452 |
| 2003/0125040 A1* | 7/2003 | Walton et al. .................. 455/454 |
| 2007/0223422 A1* | 9/2007 | Kim et al. ...................... 370/334 |
| 2007/0223423 A1* | 9/2007 | Kim et al. ...................... 370/334 |
| 2009/0074099 A1* | 3/2009 | Zheng et al. .................. 375/267 |
| 2010/0103832 A1* | 4/2010 | Zhou et al. .................... 370/252 |
| 2010/0296591 A1* | 11/2010 | Xu et al. ........................ 375/259 |

FOREIGN PATENT DOCUMENTS

WO WO2007109634 9/2007

OTHER PUBLICATIONS

C. Hoymann et al., "Evaluation of Grouping Strategies for an Hierarchical SDMA/TDMA Scheduling Process," IEEE Communications, 2007, pp. 5616-5621.
3rd Generation Partnership Project, Technical Specification Group Radio Access Network, "High Speed Downlink Packet Access (HSDPA)," Overall Description, Stage 2, Release 7, 3GPP TS 25.308, Mar. 2006, pp. 1-28.
3rd Generation Partnership Project 2, "1xEV-DO Broadcast Multicast Service Evaluation Methodology," 3GPP2 Technical Specification Group C, Working Group 3 DO Ad Hoc Group, Oct. 2004. pp. 1-21.
3rd Generation Partnership Project 2, "cdma2000 Evaluation Methodology," 3GPP2 C.R1002-0, Revision 0, Dec. 10, 2004, pp. 1-194.
3rd Generation Partnership Project 2, "cdma2000 High Rate Packet Data Air Interface Specification," 3GPP2 C.S0024-A, Version 2.0, Jul. 2005, pp. 1-194.

(Continued)

*Primary Examiner* — Leon Flores
(74) *Attorney, Agent, or Firm* — Ryan, Mason & Lewis, LLP

(57) ABSTRACT

Improved ranking and grouping techniques are disclosed for communication systems such as a multiple input multiple output system. For instance, techniques are disclosed for ranking and grouping users that are eligible for single-user and/or multiple-user transmissions. In one case, ranking and grouping are performed independently and, in another case, ranking and grouping are performed jointly.

27 Claims, 5 Drawing Sheets

OTHER PUBLICATIONS

3rd Generation Partnership Project 2, "Overview for Ultra Mobile Broadband (UMB) Air Interface Specification," 3GPP2 C.S0084-000-0, Version 2.0, Aug. 2007, 50 pages.

R. Bachl et al., "The Long Term Evolution Towards a New 3GPP* Air Interface Standard," Bell Labs Tech. Journal, vol. 11, No. 4, 2007, pp. 25-51.

Institute of Electrical and Electronics Engineers, "IEEE Standard for Local and Metropolitan Area Networks—Part 16: Air Interface for Fixed Broadband Wireless Access Systems," IEEE 802.16-2004, Oct. 2004, 857 pages.

Institute of Electrical and Electronics Engineers, "IEEE Standard for Local and Metropolitan Area Networks—Part 16: Air Interface for Fixed Broadband Wireless Access Systems, Amendment 2: Physical and Medium Access Control Layers for Combined Fixed and Mobile Operation in Licensed Bands and Corrigendum 1," IEEE 802.16e-2005, Feb. 28, 2006, 857 pages.

A. Jalali et al., "Data Throughput of CDMA-HDR a High Efficiency-High Data Rate Personal Communication Wireless System," Proc. IEEE 51st Veh, Technology Conf. (VTC), 2000, pp. 1854-1858, Japan.

P. Viswanath et al., "Asymptotically Optimal Water-Filling in Vector Multiple-Access Channels," IEEE Transactions on Information Theory, Jan. 2001, pp. 241-267, vol. 47, No. 1.

WiMax Forum, "Mobile System Profile," Release 1.0, May 2007, 90 pages.

WiMax System Evaluation Methodology, Jul. 7, 2008, 209 pages, Version 2.1.

W. Yu et al., "Optimal Power Control in Multiple Access Fading Channels with Multiple Antennas," Proc. IEEE International Conf. on Commun. (ICC), 2001, 5 pages, vol. 2, Finland.

* cited by examiner

RANKING AND GROUPING OF TRANSMISSIONS IN COMMUNICATION SYSTEM

FIELD OF THE INVENTION

The present invention relates generally to communication systems, and more particularly to communication systems wherein transmissions may be ranked and grouped.

BACKGROUND

This section introduces aspects that may help facilitate a better understanding of the inventions. Accordingly, the statements of this section are to be read in this light and are not to be understood as admissions about what is prior art or what is not prior art.

Also known as collaborative spatial multiplexing (CSM), multi-user multiple input multiple output (MU-MIMO) is a communication system feature that allows multiple users, each served by the same sector, to simultaneously transmit or receive on the same set of time-frequency resources. For some description of related developments, see, for example, 3rd Generation Partnership Project 2, "Overview for Ultra Mobile Broadband (UMB) Air Interface Specification," 3GPP2 C.S0084-000-0, v2.0, August 2007; R. Bachl et al., "The Long Term Evolution Towards a New 3GPP* Air Interface Standard," Bell Labs Tech. J., 11:4 (2007), 25-51; and Institute of Electrical and Electronics Engineers, "IEEE Standard for Local and Metropolitan Area Networks—Part 16: Air Interface for Fixed Broadband Wireless Access Systems," IEEE 802.16-2004, June 2004, the disclosures of which are incorporated by reference herein in their entirety. By employing simultaneous transmissions and therefore increasing net spectral efficiency, MU-MIMO can allow the peak aggregate transmission rate to increase and may provide the potential to improve system performance (e.g. throughput, coverage).

While the above-cited standards may specify procedures that provide support for such a feature (e.g., overhead for feedback and signaling to indicate MU-MIMO transmissions), there are a number of challenges related to ranking transmissions to meet desirable system performance and on grouping MU-MIMO eligible transmissions.

SUMMARY

Embodiments of the invention provide improved ranking and grouping techniques for communication systems such as a MIMO system. For instance, techniques are disclosed for ranking and grouping users that are eligible for single-user and/or multiple-user transmissions.

In a first aspect, a method comprises the following steps. Transmission mode eligibility is determined for candidates, wherein each candidate represents a user or a connection associated with the user, the transmissions occur between nodes in a communication network, and eligible transmission modes are a single-user transmission mode and a multiple-user transmission mode. A ranking metric is computed for each candidate. Candidates are ordered according to the ranking metric. Multiple-user transmissions are grouped using the candidate ordering such that pending single-user transmissions and multiple-user transmissions are scheduled for transmission between the nodes in the communication network. In one embodiment, the grouping step may further comprise a constrained random grouping process wherein a candidate list is considered in rank order and one of the candidates eligible for the multiple-user transmission mode is randomly grouped with one or more other candidates eligible for the multiple-user transmission mode to form a given group. In another embodiment, the grouping step may further comprise an ordered grouping process wherein the highest ranked candidate eligible for the multiple-user transmission mode is grouped with one or more next highest ranked candidates eligible for the multiple-user transmission mode to form a given group.

In a second aspect, a method comprises the following steps. A set of candidate transmissions is determined for single-user transmission and multiple-user transmission between nodes in a communication network. A ranking metric is computed for each candidate single-user transmission. A joint ranking metric is computed for each candidate multiple-user transmission. Single-user and multiple-user candidate transmissions are jointly ordered in a list according to the ranking and joint ranking metrics computed such that pending single-user transmissions and multiple-user transmissions are scheduled for transmission between the nodes in the communication network.

Advantageously, transmission ranking and grouping techniques according to embodiments of the invention yield high performance and span both single and multiple-user transmission.

These and other features and advantages of the present invention will become more apparent from the accompanying drawings and the following detailed description.

DETAILED DESCRIPTION OF THE INVENTION

The method for transmission ranking can be important in order to achieve system performance targets, e.g., meet quality-of-service (QoS) or fairness, maximize system throughput, etc. Transmission ranking as employed in present 3G cellular networks is typically based on single-user transmissions. Even with MU-MIMO, there may be the need to support single-user transmissions. For instance, the additional interference associated with MU-MIMO may take a low geometry user out of coverage or beyond the desired QoS. Hence, it may be desirable for transmission ranking with a MW-MIMO enabled to span both single and multiple-user transmissions. While simplistic ranking may be employed, such approaches can provide suboptimal performance for the ranking of single and/or multiple-user transmission cases.

Scheduling of multiple transmissions on the same time-frequency resources within a sector may result in throughput degradation due to the additional in-sector and out-of-sector interference that is emanated. Hence, the manner in which grouping is performed can have a significant effect on system performance. Further, algorithms employed to carry out grouping may be quite complex, particularly if exhaustive combinations of group candidates are considered and the number of users eligible for MU-MIMO is large.

Various embodiments provide apparatus and methods for improved ranking and grouping approaches for wireless communication systems such as a MIMO system.

Embodiments of the present invention will be illustrated below in conjunction with exemplary MIMO systems. It should be understood, however, that the invention is not limited to use with any particular type of MIMO system. The disclosed techniques are suitable for use with a wide variety of other MIMO systems, and in numerous alternative applications. For example, embodiments of the present invention may be implemented in cellular communication systems, as well as in wireless networks such as Wi-Fi or WiMax.

The term "base station" as used herein is therefore intended to be construed broadly so as to encompass, by way of example, a cellular system base station, or an access point of a wireless network. The term "terminal" or "mobile station" as used herein is intended to be construed broadly so as to encompass, by way of example, mobile telephones, portable computers, wireless email devices, personal digital assistants (PDAs) or other user communication devices, in any combination. The term "transmissions" as used herein is intended to be construed broadly so as to encompass, by way of example, the emission of power from one element in the wireless system, e.g., a base station or a terminal. Also, the terms "base station" and "terminal" may refer to nodes in an ad hoc network comprising a plurality of nodes.

Figure 1:
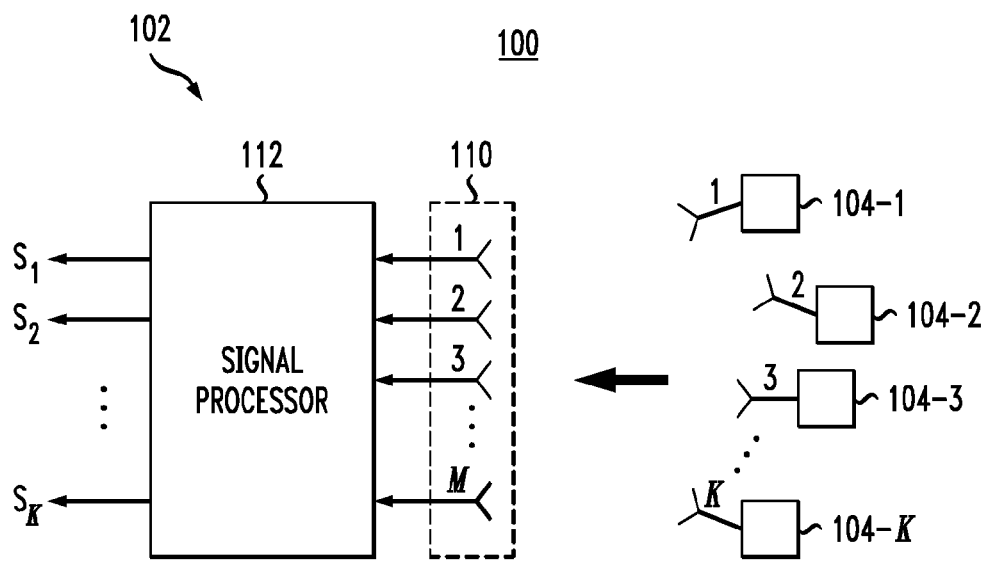
FIG. 1 is a simplified diagram of a multi-user MIMO communication system in an illustrative embodiment of the invention, more particularly showing transmission from the terminals to the base station on a reverse link.

FIG. 1 shows a multi-user MIMO system 100 comprising a base station 102 which communicates with a plurality of terminals more particularly denoted as 104-1, 104-2, ... 104-K each equipped with a single antenna denoted 1, 2, 3, ... K. The base station 102 includes an antenna array 110 comprising M antennas (1, 2, 3, ... M) as shown. Also, the base station includes a signal processor 112. In this illustrative embodiment, it is assumed that the terminals 104 transmit orthogonal pilot sequences to the base station 102 on the reverse link. Further, time division duplex (TDD) operation is assumed, such that through TDD reciprocity a channel estimator in the base station generates an estimate $\hat{H}$ of the forward channel propagation characteristics, also referred to herein as the forward channel matrix.

The signal processor 112 separates the individual user signals from one or more composite received signals, and outputs separate signals for each user (denoted $s_1, s_2, \ldots s_K$). The above mentioned channel estimates may be generated within signal processor 112 and can be stored within a memory unit for ranking/grouping purposes (to be described in detail below). For the uplink, it is assumed that ranking/grouping have been carried out by the base station using techniques described in accordance with principles of the invention, and the resources allocated to the groups selected for transmission have been scheduled (i.e., resources allocated via signaling on the downlink) in advance of the transmissions.

In other embodiments, one or more of the terminals 104 may each comprise multiple antennas, rather than a single antenna as in the present illustrative embodiment. Those skilled in the art will appreciate that the techniques disclosed herein can be adapted in a straightforward manner for use with one or more such multi-antenna terminals.

Also, the disclosed techniques can be adapted for use in MIMO systems in which the above-noted reciprocity does not apply, such as frequency-division duplex (FDD) systems.

Further, the disclosed techniques can be adapted for use in MIMO systems in which channel estimates are gathered in different ways, e.g., from channel sounding or even from data transmissions.

Figure 2:
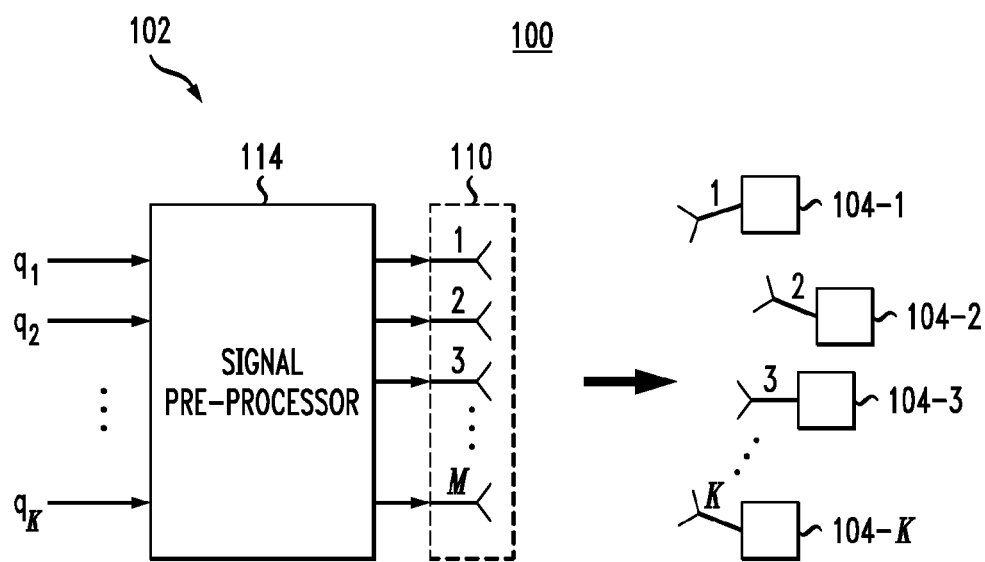
FIG. 2 is another view of the multi-user MIMO communication system of FIG. 1 more particularly showing transmission from the base station to the terminals on a forward link.

FIG. 2 illustrates the forward link of the multi-user MIMO system 100. In this view, the base station 102 transmits sequences of quadrature amplitude modulation (QAM) symbols, denoted $q_1, q_2, \ldots q_K$, selectively and simultaneously to the K single-antenna terminals 104 through a signal pre-processor 114. In one embodiment, the signal pre-processor 114 includes a linear precoder that is the pseudo-inverse of the estimate of the forward channel matrix. However, a linear precoder may not always be used. For example, if the grouping unit can find signals that are mutually orthogonal, then the signals can be directly transmitted without any preceding. Functions performed by the signal pre-processor 114 may include ranking/grouping, encoding, modulation, power allocation, and linear preceding (if desired). Ranking and grouping is carried out using techniques described in accordance with principles of the invention.

Figure 3:
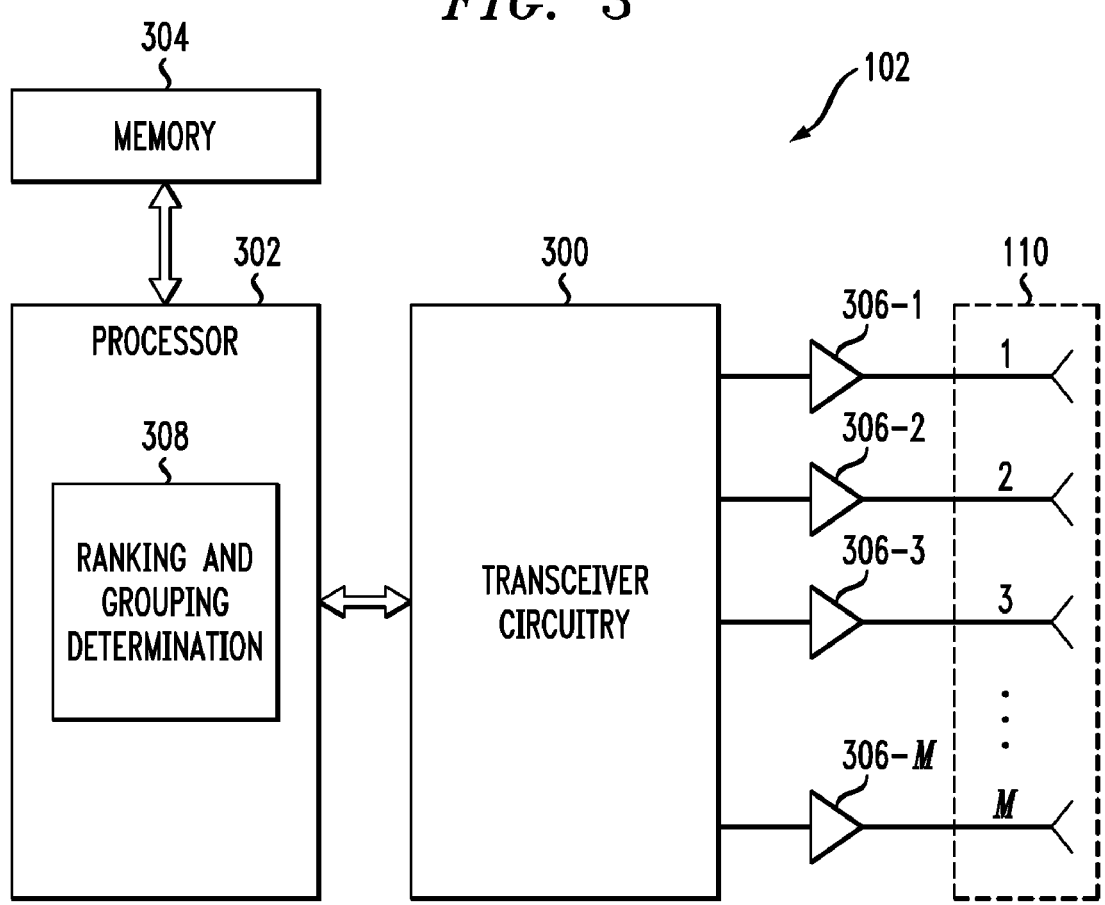
FIG. 3 is a more detailed block diagram of the base station of the multi-user MIMO communication system of FIGS. 1 and 2.

The base station 102 is shown in simplified form in FIGS. 1 and 2 for clarity of illustration, and it is to be understood that in practice a typical base station will include additional elements such as transceiver circuitry, processing circuitry, etc. A more detailed example of one possible base station configuration is shown in FIG. 3. Also, a given MIMO system may include multiple base stations, and a number of different arrangements of terminals of various types.

Figure 4:
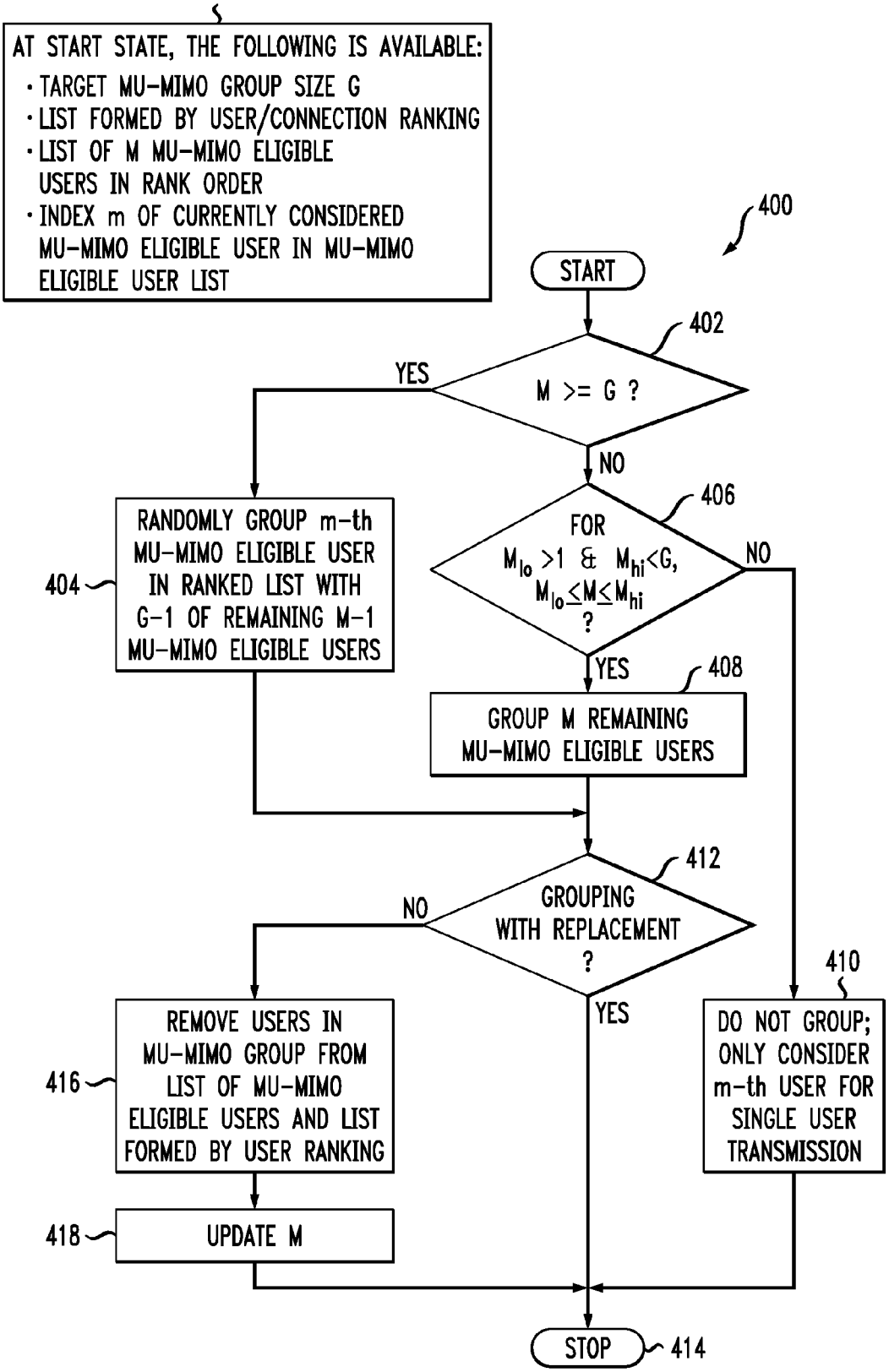
FIG. 4 is a flow diagram of an independent ranking and grouping method according to one embodiment implemented in the base station of the multi-user MIMO communication system of FIGS. 1 and 2.
Figure 5:
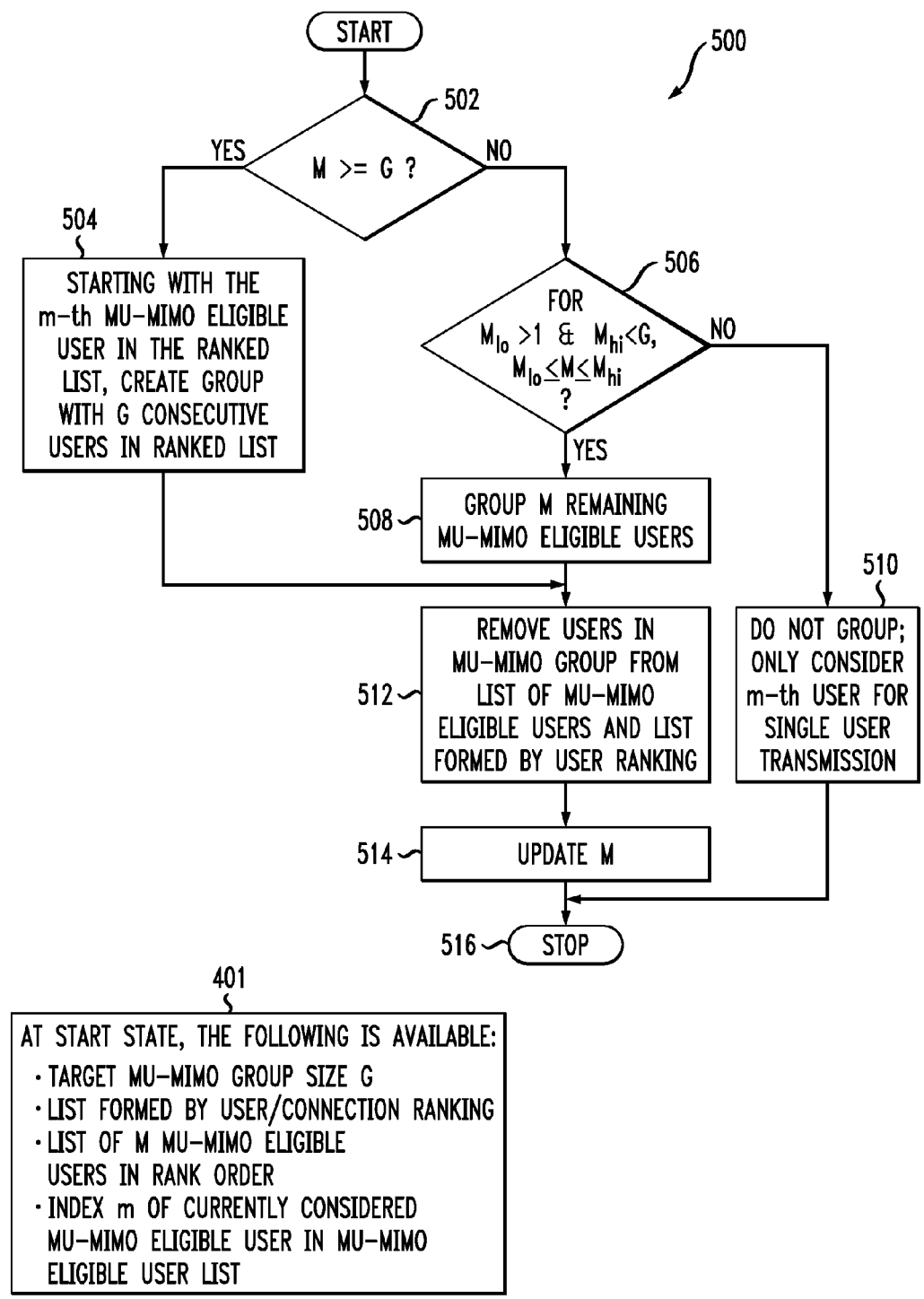
FIG. 5 is a flow diagram of an independent ranking and grouping method according to another embodiment implemented in the base station of the multi-user MIMO communication system of FIGS. 1 and 2.
Figure 6:
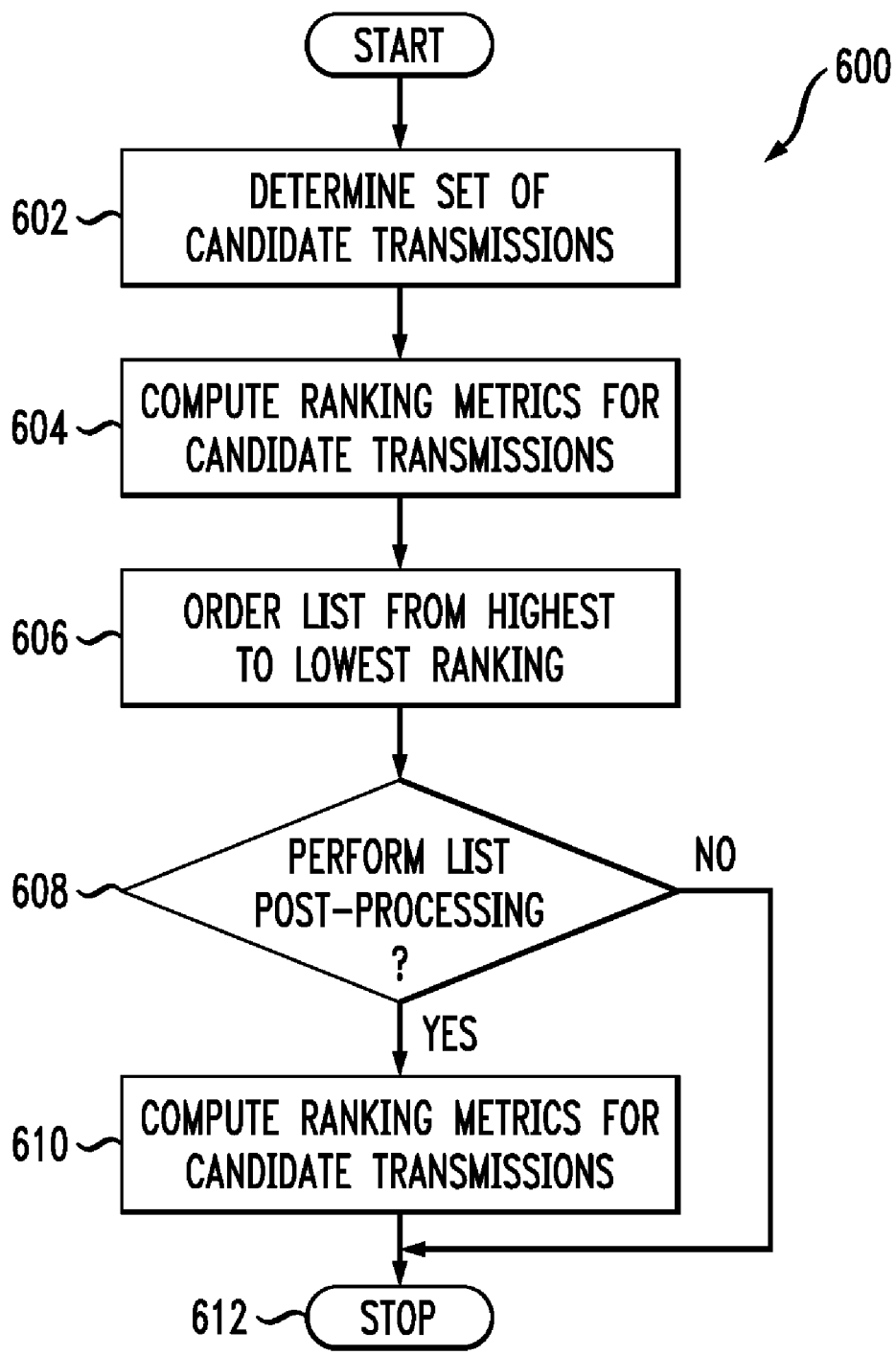
FIG. 6 is a flow diagram of a joint ranking and grouping method according to one embodiment implemented in the base station of the multi-user MIMO communication system of FIGS. 1 and 2.

FIG. 3 shows a more detailed view of one possible configuration of the base station 102 of multi-user MIMO system 100. In this embodiment, the base station 102 comprises transceiver circuitry 300, a processor 302 and a memory 304. The transceiver circuitry 300 is coupled to the M antennas of the antenna array 110 via respective power amplifiers 306-1, 306-2, ... 306-M as shown. One or more software programs for implementing the ranking and grouping processes of FIG. 4 through 6 are stored in memory 304 and executed by processor 302. The processor 302 is shown as including a ranking and grouping determination element 308, which may represent one or more functional software components or modules executed by the processor. The processor 302 may also perform the functions of signal processor 112 and signal pre-processor 114 (described above in the context of FIGS. 1 and 2, respectively), as well as any other typical base station functions. The processor 302 may comprise multiple integrated circuits, digital signal processors or other types of processing devices, and associated supporting circuitry, in any combination. It is also understood that the memory 304 may also provide storage of channel information and other scheduling related information. Of course, numerous alternative arrangements of hardware, software or firmware in any combination may be utilized in implementing the base station 102.

The power amplifier arrangement shown in FIG. 3 is associated with forward link transmission in the base station 102. Although not explicitly shown, additional elements associated with reverse link reception will also be present in base station 102, such as, for example, preamplifiers which connect respective ones of the antennas of the array 110 to receiver portions of the transceiver circuitry 300.

It is to be appreciated that the particular system configuration, operation and other characteristics of the illustrative embodiment of FIGS. 1 through 3 are presented by way of example only. Other embodiments may use different system configurations, operations, etc. depending on the needs of the particular communication application.

Detailed exemplary embodiments directed to the manner in which transmissions are ranked and grouped according to principles of the invention will now be described with reference to FIGS. 4 through 6. In these examples, ranking and grouping decisions are made subject to certain assumptions regarding configuration, operation and other characteristics of the multi-user MIMO system 100. It should be emphasized, however, that these and any other assumptions made herein are not requirements of the invention, and need not apply in other embodiments.

As will be explained in detail below, in one aspect of the invention, ranking and grouping are performed independently and without considering group-wise channel estimates (section I). The first aspect is a lower complexity approach that uses channel estimates that are available in present cellular systems (e.g., based on single user transmissions). Because available channel estimates are employed and additional processing (e.g., for group-wise channel estimates) is not needed, the method has relatively low complexity. In spite of its low complexity, the method is still able to enforce fairness/quality-of-service and achieve significant gains over the case without MU-MIMO.

Furthermore, in a second aspect of the invention, ranking and grouping are performed jointly with the use of group-wise channel estimates (section II). The second aspect is a higher complexity approach that jointly performs ranking and grouping. Since group-wise channel estimates are considered, the complexity is higher. However, the additional information can be employed to make better radio resource decisions. Principles of the invention describe a ranking metric and combine ranking and grouping into a single step, thereby reducing complexity.

As used herein, "SIMO" refers to single input multiple output communication between a single user and another node in the network (e.g., base station or another user) that comprises a single transmit antenna and multiple receive antennas. "SU-MIMO" refers to single user MIMO communication between a single user and another node in the network that comprises multiple transmit antennas and multiple receive antennas. "MU-MIMO" refers to multiple user MIMO, which is communication between multiple users and other nodes in the network that comprises one or more transmit antennas and multiple receive antennas. It is to be understood that each of these transmission modes may be realized via the MIMO system shown in FIGS. 1 and 2. It is also to be understood that SIMO and SU-MIMO may be considered "single-user transmission modes" and MU-MIMO may be considered a "multiple-user transmission mode."

I. Independent Ranking and Grouping

At each scheduling instance, a determination is made at the base station 102 concerning which packets (or "bursts" as referenced by the above-cited "IEEE Standard for Local and Metropolitan Area Networks—Part 16: Air Interface for Fixed Broadband Wireless Access Systems," IEEE 802.16-2004, June 2004) to schedule. Further, with multiple transmission modes available, there is a need to specify a method for performing ranking across different transmission modes while maintaining desired characteristics (e.g., QoS, proportional fairness). With the use of channel quality estimates based on single user transmissions that are available in cellular systems today, ranking can be performed using an existing ranking method (e.g., round robin, proportional fair). As an example, a set of users may be ranked according to the proportional fair metric:

$$M_i = \frac{R_i}{H_i},$$

where $R_i$ represents the expected rate at which this user i could be served if it were scheduled in the current frame and $H_i$ notionally represents the average rate at which the user has historically been served. Note that in this embodiment, ranking is not based on pairwise (or N-wise, if there are N simultaneous MU-MIMO transmissions) channel quality metrics; for instance, the rate $R_i$ in the above equation would be based on SIMO or SU-MIMO channel quality metrics. At the conclusion of this step, there will be a ranked list of users or connections, where each element is eligible for various transmission modes. Table 1 provides an exemplary outcome of this step assuming three transmission modes, SIMO, SU-MIMO, and MU-MIMO transmission.

TABLE 1

Ranked List of Users/Connections with Associated Transmission Mode Eligibility

| Ranking | User or Connection | SIMO Eligible? | SU-MIMO Eligible? | MU-MIMO Eligible? |
| --- | --- | --- | --- | --- |
| 1 | U1 | Y | Y | Y |
| 2 | U2 | Y | Y | N |
| 3 | U3 | Y | Y | Y |
| 4 | U4 | Y | Y | Y |
| 5 | U5 | Y | N | N |
| 6 | U6 | Y | N | Y |

Note that the ranking may be performed by the base station 102 across users or across connections, where each user may have one or more connections. A connection, typically referenced by a connection identifier (ID), may support a unique service with associated QoS requirements. For example, a user might have two active connections, one connection for best effort data and one connection for voice service. Without loss of generality, a user or connection may be referenced interchangeably.

Next, this ranked list is used to form MU-MIMO groups. While this action may be referred to as "pairing" (since the target number of simultaneous transmissions in early systems was two), illustrative principles of the invention consider the scheduling of G (where G is two or more) simultaneous transmissions and hence refer to this action as grouping. Thus, the term "grouping" is intended to include "pairing."

At the onset of every scheduling interval, the base station 102 forms a list of M MU-MIMO eligible users in rank order. Using the list exemplified in Table 1 as input, this MU-MIMO eligibility list may consists of M=4 elements and in rank order may be {U1, U3, U4, U6}. Next, the base station iterates through the ranked list exemplified in Table 1 and considers each element in rank order. If the currently considered ranked element is not eligible for MU-MIMO, grouping is not performed; else, grouping is performed. Let m=1:M represent the index of the currently considered MU-MIMO eligible user in the ranked list of MU-MIMO eligible users.

In one embodiment of the invention, constrained random grouping is employed by the base station 102 with a target MU-MIMO group size of G. The constrained random grouping process 400 is illustrated in FIG. 1. Note that block 401 represents the information available at the start state of the grouping process, such information being generated in the above ranking process.

In the first step of the grouping process, step 402, the number of remaining MU-MIMO eligible users, M, is compared to the desired group size, G. If there is a sufficient number of MU-MIMO eligible users to form the desired group size, then the m-th MU-MIMO eligible user in the ranked list of MU-MIMO eligible users is randomly grouped with G–1 of the other M–1 MU-MIMO eligible users, see step 404. If there is not a sufficient number of remaining MU-MIMO eligible users to form the desired group size, there is a check to determine whether a smaller group size within allowable limits shall be allowed, see step 406. If the check returns true, then the M remaining MU-MIMO eligible users are grouped, see step 408. If the check returns false, then a group is not formed and only the m-th MU-MIMO eligible user shall be considered for single user transmission, see step 410.

Next, if a group has been formed, a check is performed whether grouping is to be performed with or without replacement, see step 412. Grouping without replacement implies that after a user is selected for a MU-MIMO group, it is not eligible for inclusion in other MU-MIMO groups formed in the current frame. If it is the former, then no further action is required, see block 414. If it is the latter, then the process removes users found in the newly formed MU-MIMO group from the list of MU-MIMO eligible users and the list of ranked elements formed in the ranking step (exemplified in Table 1), see step 416. The process then updates M by subtracting out the number of users in the newly formed MU-MIMO group, see step 418. The grouping process 400 for the currently considered ranked element ends at block 414.

One benefit of constrained random grouping relative to pure random grouping is that some semblance of fairness (e.g., proportional fair) can be maintained. For instance, users with a high proportional fair ranking are more likely to be scheduled in the current frame than a lowly ranked element. Also, it is to be appreciated that the term "random" as used herein can mean either "pseudo-random" or "random."

In another embodiment of the invention, ordered grouping is employed by the base station 102 with a target MU-MIMO group size of G. In contrast to constrained random grouping, ordered grouping forms MU-MIMO groups in rank order. For example, the G highest ranked MU-MIMO eligible users will form the first group, the next G highest ranked MIMO eligible users will form the second group, and so forth. In this way, the MU-MIMO eligible users with higher priority are more likely to be scheduled in the current frame.

The ordered grouping process 500 is illustrated in FIG. 5. Note that block 501 represents the information available at the start state of the grouping process, such information being generated in the above ranking process.

In the first step, step 502, the number of remaining MU-MIMO eligible users, M, is compared to the desired group size, G. If there is a sufficient number of MU-MIMO eligible users to form the desired group size, then the m-th MU-MIMO eligible user in the ranked list of MU-MIMO eligible users is grouped with the next G–1 highest ranked users, see step 504. If there is not a sufficient number of remaining MU-MIMO eligible users to form the desired group size, there is a check made to determine whether a smaller group size within allowable limits shall be allowed, see step 506. If the check returns true, then the M remaining MU-MIMO eligible users are grouped, see step 508. If the check is false, then a group is not formed and only the m-th MU-MIMO eligible user shall be considered for single user transmission, see step 510.

Next, if a group has been formed, the process removes users found in the newly formed MU-MIMO group from the list of MU-MIMO eligible users and the list of ranked elements formed in the ranking step (exemplified in Table 1), see step 512. The process then updates M by subtracting out the number of users in the newly formed MU-MIMO group, see step 514. The grouping process 500 ends at block 516. Note that ordered grouping differs from constrained random grouping in that the highest ranked MU-MIMO eligible users always have precedence.

Consider the following examples illustrated in Tables 2 and 3, which are used to illustrate the methods described in FIGS. 4 and 5, respectively. First consider constrained random grouping for G=2 without replacement and using Table 1 as input. The first ranked element in Table 1 contains U1, which is MU-MIMO eligible. Using the constrained random grouping method for G=2 without replacement, U4 is selected randomly among U3, U4, and U6, which are MU-MIMO-eligible and still on the MU-MIMO-eligible list; U4 is removed from the MU-MIMO eligible list and the list formed by user/connection ranking. Later, the next ranked element in Table 1, U2, is considered and is selected for SU-MIMO transmission. The next ranked element in Table 1 is U3, which is MU-MIMO-eligible. Since U6 is the only remaining MU-MIMO-eligible user (due to grouping without replacement), U6 is selected by the constrained random grouping method and is removed from the MU-MIMO-eligible list and the list formed by user/connection ranking. The last remaining ranked element in Table 1 is U5, which is scheduled for SIMO transmission.

TABLE 2

Ranked List after Constrained Random Grouping for G = 2 without Replacement

| Ranking | User or Connection | Transmission Mode |
|---|---|---|
| 1 | U1, U4 | MU-MIMO |
| 2 | U2 | SU-MIMO |
| 3 | U3, U6 | MU-MIMO |
| 4 | U5 | SIMO |

Table 3 below exemplifies the modified ranked list for ordered grouping with G=3.

TABLE 3

Ranked List after Ordered Grouping for G = 3

| Ranking | User or Connection | Transmission Mode |
|---|---|---|
| 1 | U1, U3, U4 | MU-MIMO |
| 2 | U2 | SU-MIMO |
| 3 | U5 | SIMO |
| 4 | U6 | SIMO |

Note that in order to ensure that there are a sufficient number of ranked elements to fill the frame and/or the ability to schedule multiple bursts per user per frame (e.g., a user may have multiple connections, each supporting a different stream, say one for browsing and one for a voice call), one may optionally append the single user transmissions for users that were included in MU-MIMO groups at the end of the list in rank order. Hence, single user transmissions for U1, U3, U4, and U6, in that order, would be appended to the end of Table 2; similarly, U1, U3, and U4, in that order, would be appended to the end of Table 3.

Also note that the methods described herein do not explicitly take into account the signal-to-interference-plus-noise ration (SINR) for the N-wise simultaneous transmissions associated with MU-MIMO. In most present systems, radio resource management (e.g., scheduling, power, transmission mode determination) decisions are made using channel quality estimates that are based on single user (e.g. SIMO, SU-MIMO) transmissions and are either fed back by mobile stations or derived by the serving base station. With MU-MIMO, radio resource management (RRM) decisions would ideally consider the estimate of channel quality for the N-wise simultaneous transmissions associated with MU-MIMO, but doing so is complex.

First, the channel quality estimate would ideally be computed using the receiver (e.g., receiver employing Minimum Mean Square Error, Most Likely, and Successive Interference Cancellation techniques) employed on the relevant link. Second, there may be many combinations over which these computations must be made. For instance, if there are 15 candidate MU-MIMO users and either two or three simultaneous transmissions would be considered, this would require (15 choose 2)+(15 choose 3)+15=575 channel quality estimate computations; with SIMO or SU-MIMO transmission, only 15 such computations are required. With users that are mobile, channel variations need relatively frequent updates of channel quality estimates and the additional processing required for N-wise MU-MIMO channel quality estimates is considerable. As such, the methods described address the lower complexity case where existing SIMO or SU-MIMO channel quality estimates may be used to achieve performance gain.

Before moving to the more complex case below which jointly determines ranking and grouping, there is an alternate embodiment of the invention whereby the ranked list of users or connections is taken as input, as is the case for constrained random and ordered pairing, but a limited number of group-wise channel metrics are computed to improve performance. Considering the elements of the list in rank order, when a MU-MIMO eligible user is encountered, a group-wise metric is computed for different combinations of groups spanning the currently considered MU-MIMO eligible user with the remaining MU-MIMO eligible users with lower rank. Among the candidate groups, selection can be based on several criteria that are known in the art such as minimizing mutual interference, or maximizing SINR for users in the group. Because users are scheduled according to their priority, fairness can be maintained. Further, this method employs a limited number of group-wise metrics, thus improving performance, but in a less complex way than considering exhaustive combinations. For example, if there are 10 MU-MIMO eligible users, the desired group size is 2, and MU-MIMO eligible users can only be assigned to one group per scheduling instance, this method would involve the calculation of metrics for 9+7+5+3+1=25 groups, where the first MU-MIMO eligible user is considered in combination with the 9 remaining MU-MIMO eligible users, the second MU-MIMO eligible user is considered in combination with the 7 remaining MU-MIMO eligible users, and so on. In contrast, the consideration of exhaustive group combinations would involve the calculation of metrics for $$\binom{10}{2} = 45$$

groups.

II. Joint Ranking and Grouping

At each scheduling instance, a determination is made by the base station 102 concerning which packets (or "bursts") to schedule. Further, with multiple transmission modes available, there is a need to specify a method for ranking SIMO, SU-MIMO, and/or MU-MIMO eligible transmissions while maintaining desired characteristics (e.g., QoS, proportional fairness).

Systems today typically perform ranking based on channel quality for individual users. As an example, consider the proportional fair metric:

$$M_i = \frac{R_i}{H_i},$$

where $R_i$ represents the expected rate at which this user i could be served if it were scheduled in the current frame and $H_i$ notionally represents the average rate at which the user has historically been served. In the case of single user transmission, the rate $R_i$ in the above equation would be based on SIMO or SU-MIMO channel quality metrics.

In the case of MU-MIMO, multiple simultaneous transmissions may be considered for scheduling in the current frame. In this case, the proportional fair metric for each user in a group of size N can be computed as:

$$M_i = \frac{K * R_i}{H_i}$$

where $R_i$ is computed as a function of the group-wise SINR, $SINR_i$, $H_i$ is computed as before, and K is a number ranging from 1 to N. In one embodiment of the invention, K is set to one. In another embodiment, K is set to N to account for a potential increase in the target burst size for MU-MIMO users.

With the metric for each user in a MU-MIMO group established, a joint metric is used to rank different transmission candidates. In one embodiment, the joint metric is formed by taking the product of each user metric, $M_i$, in the group. In another embodiment, the joint metric is formed by taking the sum of each user metric, $M_i$, in the group. In yet another embodiment, the joint metric is formed by taking the average across user metrics in the group.

The process 600 for joint ranking/grouping is illustrated in FIG. 6. In the first step, step 602, the set of eligible transmission combinations is determined. In one embodiment of the invention, all users with an SINR equal or greater than a specified threshold (the threshold potentially being different for each user and set according to various factors such as QoS) are deemed eligible for MU-MIMO grouping. In this case, all combinations according to one or more target group sizes G shall be considered eligible MU-MIMO transmissions. Users with an SINR that falls below the threshold are only eligible for single user transmission. In another embodiment of the invention, eligible transmission combinations are based on thresholding of joint channel metrics that represent the degree of separability between the channels of a group of users, e.g., angle/direction of arrival, explicit orthogonality metrics.

In the second and third steps, steps 604 and 606, the ranking metric is computed for each candidate transmission and these are placed in rank order. If so selected (based on decision point 608), in a fourth step, step 610, an update is performed for users found in multiple ranked elements. In one embodiment, users are only allowed to appear in one ranked element. Following the list in rank order, users found in the highest ranked element are identified and lower ranked elements containing these users are removed from the ranked list. In another embodiment of the invention, users found in the highest ranked element are identified and the priority for lower ranked elements containing these users are revised to reflect changes in power, historical rate, and/or resource availability associated with the higher ranked transmissions containing the user. If a new metric is computed, the ranked elements are ordered once more.

At the conclusion of this step, there will be a ranked list, where each ranked element has an associated transmission mode and one or more users. Note that grouping is implicit in this ranking method as highly ranked groups will be selected for transmission in the current frame. Table 4 provides an exemplary outcome of this step with G=2. Note that there are a total of 16 ranked elements, $$\binom{N}{G}$$

for MU-MIMO, 4 for SU-MIMO, and 6 for SIMO. Further, note that the number of ranked elements per user is determined according to the transmission mode eligibility determined in the previous step. The process ends at block 612.

TABLE 4

Ranked List with Transmission Modes

| Ranking | User or Connection | Transmission Mode |
|---|---|---|
| 1 | U3, U4 | MU-MIMO |
| 2 | U3, U6 | MU-MIMO |
| 3 | U4, U6 | MU-MIMO |
| 4 | U1, U3 | MU-MIMO |
| 5 | U3 | SU-MIMO |
| 6 | U1, U4 | MU-MIMO |
| 7 | U4 | SU-MIMO |
| 8 | U1, U6 | MU-MIMO |
| 9 | U2 | SU-MIMO |
| 10 | U1 | SU-MIMO |
| 11 | U3 | SIMO |
| 12 | U4 | SIMO |
| 13 | U6 | SIMO |
| 14 | U5 | SIMO |
| 15 | U2 | SIMO |
| 16 | U1 | SIMO |

It is to be appreciated that the particular assumptions, configurations and other characteristics of the illustrative embodiments described above are presented by way of example only. Accordingly, the particular MIMO system configuration shown in FIGS. 1 and 2 may be altered in other embodiments. Also, the configuration of the base station of FIG. 3 may be altered to accommodate particular applications. Still further, one or more steps shown in FIGS. 4 through 6 may be rearranged, deleted, and others not presently illustrated may be added. These and numerous other alternative embodiments within the scope of the appended claims will be readily apparent to those skilled in the art.

What is claimed is:

1. A method, comprising: determining eligibility of transmission modes for candidates, wherein each candidate represents a user or a connection associated with the user, the transmissions are between nodes in a communication network, and the eligible transmission modes are a single-user transmission mode and a multiple-user transmission mode; computing a ranking metric for each candidate; ordering the candidates according to the ranking metric; and grouping multiple-user transmissions using the ordering of the candidates such that pending single-user transmissions and multiple-user transmissions are scheduled for transmission between the nodes in the communication network; wherein the determining, computing, ordering and grouping steps are performed by at least one processor device.

2. The method of claim 1, wherein the grouping step further comprises a constrained random grouping process.

3. The method of claim 2, wherein the constrained random grouping process comprises considering a list of candidates in rank order and randomly grouping a given one of the candidates eligible for the multiple-user transmission mode with one or more other candidates eligible for the multiple-user transmission mode to form a given group, when there is a sufficient number of such candidates.

4. The method of claim 2, wherein the grouping process uses grouping with replacement.

5. The method of claim 2, wherein the grouping process uses grouping without replacement.

6. The method of claim 1, wherein the grouping step further comprises an ordered grouping process.

7. The method of claim 6, wherein the ordered grouping process comprises grouping the highest ranked candidate eligible for the multiple-user transmission mode with one or more next highest ranked candidates eligible for the multiple-user transmission mode to form a given group, when there is a sufficient number of such candidates.

8. The method of claim 1, wherein the grouping step further comprises comparing the number of candidates eligible for the multiple-user transmission mode, and currently in the list, with a given size of a group to determine whether there is a sufficient number of such candidates to form the given group size.

9. The method of claim 8, wherein the grouping step further comprises determining whether a group size smaller than the given group size is allowable, when there is not a sufficient number of candidates eligible for the multiple-user transmission mode.

10. The method of claim 9, wherein the grouping step further comprises grouping the candidates eligible for the multiple-user transmission mode remaining in the ordered list into the smaller group size, when a smaller group is allowable.

11. The method of claim 9, wherein the grouping step further comprises considering the subject candidate eligible for the multiple-user transmission mode for a single-user transmission, when a smaller group is not allowable.

12. The method of claim 8, wherein the grouping step further comprises removing the candidates that form the group from the ordered candidate list.

13. The method of claim 1, further comprising the steps of:
selecting candidate groups of multiple-user transmissions formed in the grouping step; and
computing a group-wise metric for one or more combinations of the candidate groups.

14. The method of claim 13, wherein the selecting step is based on minimizing mutual interference or maximizing a signal-to-interference-plus-noise ratio for users or connections in a given group.

15. An article of manufacture comprising a non-transitory processor-readable storage medium storing one or more software programs which when executed by a processor perform the steps of the method of claim 1.

16. A method, comprising: determining a set of candidate transmissions for single-user transmission and multiple-user transmission between nodes in a communication network; computing a ranking metric for each candidate single-user transmission; computing a joint ranking metric for each candidate multiple-user transmission; and jointly ordering single-user and multiple-user candidate transmissions in a list according to the ranking and joint ranking metrics computed such that pending single-user transmissions and multiple-user transmissions are scheduled for transmission between the nodes in the communication network; wherein the determining, computing and ordering steps are performed by at least one processor device.

17. The method of claim 16, wherein the determining step further comprises grouping into a multiple-user transmission mode group two or more candidate transmissions associated with users having a signal-to-interference-plus-noise ratio equal to or greater than a given threshold value.

18. The method of claim 17, wherein the given threshold value for one user or connection is different than the given threshold value for another user or connection.

19. The method of claim 16, wherein the determining step further comprises identifying for transmission via a single-user transmission mode one or more candidate transmissions associated with users or connections having a signal-to-interference-plus-noise ratio less than a given threshold value.

20. The method of claim 16, wherein the determining step further comprises determining eligible transmission combinations based on thresholding of joint channel metrics that represent the degree of separability between the channels of a group of users or connections.

21. The method of claim 16, further comprising the step of updating the list when users or connections are found in multiple ranked elements of the list.

22. The method of claim 21, wherein the updating step is performed such that users or connections appear in one ranked element, wherein users or connections found in the highest ranked element are identified and lower ranked elements containing these users or connections are removed from the list.

23. The method of claim 21, wherein the updating step is performed such that users or connections found in the highest ranked element are identified and the priority for lower ranked elements containing such users or connections are revised to reflect changes in at least one of power, a historical rate and resource availability associated with the higher ranked transmissions containing the user or connection.

24. The method of claim 16, wherein the joint ranking metric is computed by calculating a product, a sum, or an average of respective user or connection metrics in a given group.

25. An article of manufacture comprising a non-transitory processor-readable storage medium storing one or more software programs which when executed by a processor perform the steps of the method of claim 16.

26. A processing node of a multiple-input, multiple-output communication system, the processing node being configured to communicate with multiple other nodes of the system, wherein the processing node is operative to determine eligibility of transmission modes for candidates, wherein each candidate represents a user or a connection associated with the user and the eligible transmission modes are a single-user transmission mode and a multiple-user transmission mode; to compute a ranking metric for each candidate; to order the candidates according to the ranking metric; and to group multiple-user transmissions using the ordering of the candidates such that pending single-user transmissions and multiple-user transmissions are scheduled for transmission.

27. A processing node of a multiple-input, multiple-output communication system, the processing node being configured to: communicate with multiple other nodes of the system, wherein the processing node is operative to determine a set of candidate transmissions for single-user transmission and multiple-user transmission; to compute a ranking metric for each candidate single-user transmission; to compute a joint ranking metric for each candidate multiple-user transmission; and to jointly order single-user and multiple-user candidate transmissions in a list according to the ranking and joint ranking metrics computed such that pending single-user transmissions and multiple-user transmissions are scheduled for transmission.

* * * * *